United States Patent
Sprenger et al.

(10) Patent No.: US 10,479,726 B2
(45) Date of Patent: *Nov. 19, 2019

(54) FIBERSIZING WITH SMALL AMOUNTS OF NANOMATERIALS

(71) Applicant: Evonik Degussa GmbH, Essen (DE)

(72) Inventors: Stephan Sprenger, Oststeirbek (DE); Matthias Naumann, Hamburg (DE)

(73) Assignee: Evonik Degussa GmbH, Essen (DE)

( * ) Notice: Subject to any disclaimer, the term of this patent is extended or adjusted under 35 U.S.C. 154(b) by 50 days.

This patent is subject to a terminal disclaimer.

(21) Appl. No.: 15/554,374

(22) PCT Filed: Mar. 7, 2016

(86) PCT No.: PCT/EP2016/054726
§ 371 (c)(1),
(2) Date: Aug. 29, 2017

(87) PCT Pub. No.: WO2016/142311
PCT Pub. Date: Sep. 15, 2016

(65) Prior Publication Data
US 2018/0044233 A1     Feb. 15, 2018

(30) Foreign Application Priority Data

Mar. 10, 2015 (EP) .................. 15158363

(51) Int. Cl.
| | | |
|---|---|---|
| *C03C 25/00* | (2018.01) | |
| *C03C 25/47* | (2018.01) | |
| *C03C 25/26* | (2018.01) | |
| *C03C 25/36* | (2006.01) | |
| *C08J 5/08* | (2006.01) | |

(52) U.S. Cl.
CPC ............. *C03C 25/47* (2018.01); *C03C 25/26* (2013.01); *C03C 25/36* (2013.01); *C08J 5/08* (2013.01); *C08J 2363/00* (2013.01)

(58) Field of Classification Search
CPC ......... C03C 25/47; C03C 25/26; C03C 25/36; C03C 25/00; C08J 5/08

USPC .......................................... 428/378
See application file for complete search history.

(56) References Cited

U.S. PATENT DOCUMENTS

| | | |
|---|---|---|
| 3,312,569 A | 4/1967 | Philipps et al. |
| 2008/0160302 A1 | 7/2008 | Asrar et al. |
| 2009/0092832 A1 | 4/2009 | Moireau |
| 2013/0040108 A1 | 2/2013 | Asrar et al. |
| 2018/0030648 A1* | 2/2018 | Sprenger .................. H01B 1/04 |

FOREIGN PATENT DOCUMENTS

| | | |
|---|---|---|
| JP | 9-208268 A | 8/1997 |
| WO | 2013/011256 A1 | 1/2013 |

OTHER PUBLICATIONS

International Search Report dated May 6, 2016 in PCT/EP2016/054726 filed Mar. 7, 2016.
R.E. Jensen et al., "Inorganic-organic fiber sizings for enhanced energy absorption in glass fiber-reinforced composites intended for structural applications", Composites Science and Technology, Mar. 1, 2006, vol. 66, pp. 509-521, XP005197019.
Bin Wei et al., "Strengthening of basalt fibers with nano-$SiO_2$-epoxy composite coating", Materials and Design, Apr. 21, 2011, vol. 32, pp. 4180-4186, XP028224835.
Bin Wei et al., "Surface modification and characterization of basalt fibers with hybrid sizings", Composites: Part A, Jan. 1, 2011, vol. 42, pp. 22-29, XP027518260.

* cited by examiner

*Primary Examiner* — Hannah J Pak
(74) *Attorney, Agent, or Firm* — Oblon, McClelland, Maier & Neustadt, L.L.P.

(57) ABSTRACT

Nanoparticle-coated fibre material, the coating of which includes between 0.01 and less than 2.0 wt % of nanoparticles based on the dry weight of the coated fibre material and is capable of undergoing further reactions, a process for producing the nanoparticle-coated fibre materials, and also corresponding fibre composite materials.

12 Claims, No Drawings

FIBERSIZING WITH SMALL AMOUNTS OF NANOMATERIALS

The invention relates to nanoparticle-coated fibre material, the coating of which includes between 0.01 and less than 2.0 wt % of nanoparticles based on the dry weight of the coated fibre material and is capable of undergoing further reactions, a process for producing the nanoparticle-coated fibre materials, and also corresponding fibre composite materials.

Lightweight construction is one of the key technologies for coping with the challenges of the 21st century. The use of fibre composite materials is indispensable for lightweight construction. Their increasing use in transport, for example in aircraft construction, in rail vehicle construction or in automotive construction, in mechanical engineering or in civil engineering is asking more and more of the performance of these fibre composites. Rotor blades for wind-driven power generators are being manufactured in increasing length and so have to meet higher and higher mechanical stability requirements.

Fibre composite materials, particularly for high performance applications, are frequently produced using thermoset or thermoplastic polymer matrices. These polymer matrices are optimized for their performance in the fibre composite. Similarly, the reinforcing fibres used, whether short or continuous-filament fibres, and also the textile constructs produced therefrom, whether wovens, knits, noncrimps or preforms, are likewise optimized, in terms of structure and design, for their application in the component part.

The failure behaviour of a fibre composite is mainly dependent on the quality of the interface between fibre and polymer matrix. Good attachment of the fibre to the thermoset or thermoplastic polymer matrix and also good fibre wetting are absolute requirements.

There are in principle two ways of solving this problem by admixture of nanomaterials. Nanomaterials could either be incorporated in the polymer matrix in relatively large amounts, or could be coated onto the fibres.

This problem is solved by sizing the fibre during its production process. The functions of sizing are firstly to protect the fibre, i.e. not only the monofilaments but also the fibre bundle (roving) during the further processing steps, and secondly to later attach the fibre to the thermoset or thermoplastic polymer matrix. Sizing can also be used to influence further fibre properties, for example its antistatic behaviour. The constituents of the sizing are aligned with the fibre type, e.g. glass or carbon fibre, the fibre fineness and the later intended use, for example processing in epoxy resins or unsaturated polyester resins.

WO 2007/074281 discloses that a coating which contains from 2 to 18 wt % of $SiO_2$ nanoparticles in the fibre sizing improves the processability of glass fibres (reduced abrasion) and the moist ageing of the fibres, although the mechanical data disclosed for fibre composite materials make it impossible to deduce the diameter of the boehmite particles used. Based on the solids content, the data can be used to compute that the coating contains about 7.5 wt % of boehmite. The only example disclosing silica materials (Example 15) must be taken to suggest that the coating contains 35 wt % of nanomaterial; no mechanical data are disclosed for composite materials.

Sprenger (J Mater Sci, 44 (2009) pp. 342-5) discloses fibre composite materials containing nanoparticles uniformly distributed in the polymer. The mechanical properties are not significantly affected as a result, even at 10 wt % of silicon dioxide particles in the matrix, compared with the use of other particles.

Yang (Mat Letters 61 (2007) pp. 3601-4) discloses carbon fibre sizing comprising $SiO_2$ nanoparticles and the positive effect on ASTM D-2344 interlaminar shear strength, but does not disclose any quantitative particulars whence the particle content on the fibres can be deduced. No other laminate properties were found to be improved.

The prior art is disadvantageous in that relatively large amounts of nanomaterials are used.

It is an object of the present invention to simplify the prior art process by using smaller amounts of nanomaterials.

Surprisingly, the presence of even small amounts of nanomaterials in the sizing is found to lead to an excellent improvement in the mechanical properties of the fibre composite materials.

The present invention accordingly provides nanoparticle-coated fibre material, wherein the coating includes between 0.01 and less than 2.0 wt % of nanoparticles based on the dry weight of the coated fibre material and is capable of undergoing further reactions.

Nanoparticles herein are particles which are organic or inorganic in nature, preferably inorganic in nature, more preferably oxidic and/or hydrooxidic in nature and yet more preferably non-mineral in origin, while it is particularly preferable for the particles to contain oxides and/or hydroxides of aluminium, of titanium, of zinc, of tin, of vanadium, of cerium, of iron, of magnesium and of silicon while it is yet more preferable for the particles to be $SiO_2$ particles. The $SiO_2$ particles are preferably selected from precipitated silica, colloidal silica, diatomaceous earth (kieselguhr) and pyrogenous silica, more preferably colloidal silica.

The $SiO_2$ particles preferably have a surface treatment to render them hydrophobic. Particular preference is given to the surface-modified particles disclosed in EP2067811 (US 2009/0149573) in paragraphs 60 to 65, while the surface treatment of the $SiO_2$ nanoparticles is yet more preferably with alkyl- or aryl-alkoxysilanes.

It is more preferable for the inorganic particles to have a surface treatment. The surface treatment is preferably carried out with compounds selected from organosilicon compounds such as trialkylchlorosilane, dialkyldichlorosilane, alkylalkoxysilanes, arylalkoxysilanes, hexamethyldisilazane, (meth)acryloyloxypropyltrialkoxysilanes, aminopropyltrialkoxysilanes, polydimethylsiloxanes, polysiloxanes, SiH-functional polysiloxanes, carboxylic acids, chelating agents and fluoropolymers and also mixtures thereof.

The shape of the nanoparticles is preferably spherical or irregular, more preferably spherical.

Particularly preference is given to nanoparticle-coated fibre material, the coating of which includes between 0.01 and less than 2.0 wt % of nanoparticles based on the dry weight of the coated fibre material and is capable of undergoing further reactions, wherein the nanoparticles are surface-modified spherical silica nanoparticles.

The average diameter of the nanoparticles is preferably in the range from 1 to 300 nm, more preferably in the range from 1 to 200 nm, yet more preferably in the range from 2 to 150 nm, yet still more preferably in the range from 3 to 100 nm and most preferably in the range from 5 to 50 nm.

Nanoparticle diameter before application atop the fibre is preferably determined by dynamic light scattering (DLS). The average values are mean DLS equivalent diameters. The diameters of nanoparticles on the fibre are determined from electron micrographs. The average values are then arithmetic in kind.

Preference is further given to mixtures of nanoparticles differing in nature, the mixtures containing at least $SiO_2$ particles, the $SiO_2$ particle content of these mixtures preferably being more than 50 wt %, more preferably more than 80 wt %, yet more preferably more than 95 wt % and most preferably more than 99 wt %, all based on the total mass of all nanoparticles.

Particular preference is given to $SiO_2$ nanoparticles having a diameter of 5 to 50 nm, the surface of which has been modified to render it hydrophobic, in particular with alkylalkoxysilanes and/or arylalkoxysilanes.

Fibre materials are preferably monofilaments, fibre bundles containing monofilaments, strands containing monofilaments or fibre bundles. The fibre materials are further preferably products such as non-crimp and woven fabrics containing monofilaments, fibre bundles or strands. Non-crimp fabrics containing fibre bundles are particularly preferable. Wovens are preferably plain-woven. Preferred non-crimp fabrics are constructed in layers, which may be oriented in the same direction (making for a uniaxial construction) or in different directions (making for a multiaxial construction).

The advantage of non-crimp fabrics is that there is no interlacing to bend the fibres or fibre bundles of the layers. Non-crimp fabrics are accordingly better able to absorb forces.

The fibre materials are preferably glass fibre materials, mineral fibre materials, natural fibres and/or polymer fibre materials, more preferably glass fibre materials.

The fibre materials are yet more preferably non-crimp fabrics formed from glass fibres and yet still more preferably the fibre materials are non-crimp fabrics formed from glass fibre bundles.

The fibre materials are preferably manufactured raw materials, as cleaned materials or already coated, preference being given to the use of cleaned fibre materials. Cleaning is preferably material-dependent, a cleaning process is preferably a thermal treatment, more preferably an irradiative treatment by means of an IR radiator. The thermal treatment may optionally be carried out under a protective gas.

A preferred IR radiator is 1 m in length. The fibre material is led past the IR radiator at a distance of 5 mm to 10 cm, preferably 1 cm to 3 cm. Compounds present on the surface of the fibre material are decomposed by the irradiative treatment. The operation is optimized such that even after renewed irradiation under identical conditions, the mass of a test specimen or of two or more identical test specimens does not differ by more than 1% of the measured value.

The coated fibre material of the present invention is preferably coated with the nanomaterials when it is in the form of monofilaments, fibre bundles, wovens or non-crimps, while it is more preferable to coat fibre bundles with the nanomaterials.

The nanomaterial content of the fibre materials according to the present invention is preferably in the range from 0.05 to 1.6 wt %, more preferably in the range from 0.1 to 1.2 wt % and yet more preferably in the range from 0.2 to 1.0 wt % based on the dry weight of the coated fibre.

It is particularly preferable for the nanoparticle-coated fibre materials of the present invention to be such fibre bundles as were coated with alkylalkoxysilane and/or arylalkoxysilane surface-treated spherical $SiO_2$ nanoparticles in an epoxy resin, while the coated fibre bundles include between 0.1 and 1.2 wt % of nanoparticles based on the dry weight of the coated fibre bundles, and wherein the coating is capable of undergoing further reactions.

The further reactions of the coating on the fibre material are reactions to form chemical bonds with a polymer matrix by crosslinking reactions. The polymer matrix and the nanoparticle-coated fibre materials of the present invention can combine to form a fibre composite material wherein the surface of the coating on the fibre materials is capable of reacting with the polymer matrix.

These reactions preferably comprise a ring-opening polymerization of epoxides.

The invention further provides a process for producing nanoparticle-coated fibre material, the coating of which includes between 0.01 and less than 2.0 wt % of nanoparticles based on the dry weight of the coated fibre material and wherein the fibre material is contacted with an aqueous emulsion containing a nanoparticle-containing film-former by dipping, spraying or using a bath, and wherein the coated fibre material is subsequently dried, wherein the aqueous emulsion contains surface-modified spherical silica nanoparticles.

In a preferred embodiment of the process which the present invention provides for producing nanoparticle-coated fibre material, the coating of which includes between 0.01 and less than 2.0 wt % of nanoparticles based on the dry weight of the coated fibre material, the fibre material is contacted with a bath, the bath contains an aqueous emulsion of a nanoparticle-containing film-former and the coated fibre material is subsequently dried.

Preferably, the fibre material is not directly dipped into the bath, instead a rotating applicator roll applies the nanoparticle-containing film-former atop the fibre material. Preferably, the applicator roll dips with its bottom side into the bath, picks up a certain amount of film-former in the form of a film as it rotates, and the fibre material is contacted with the nanoparticle-containing film-former on the top side of the roll. The amount applied to the fibre material in the process is dependent on the substance properties of the aqueous emulsion of the nanoparticle-containing film-former, preferably the viscosity, and on the speed of rotation of the roll, on the diameter of the roll and on the surface constitution of the roll. The speeds of the roll and of the fibre material are preferably aligned such that there is no slip friction.

The film-former is preferably a reactive, crosslinkable monomer or oligomer, more preferably an epoxy resin.

More preference is given to the process for producing nanoparticle-coated fibre material, the coating of which includes between 0.01 and less than 2.0 wt % of nanoparticles based on the dry weight of the coated fibre material and wherein the fibre material is contacted with an aqueous emulsion containing a nanoparticle-containing film-former by dipping, spraying or using a bath, and wherein the coated fibre material is subsequently dried, wherein the aqueous emulsion contains surface-modified spherical silica nanoparticles, wherein the film-former is an epoxy resin.

The aqueous emulsion of the nanoparticle-containing film-former preferably contains further components, preferably selected from viscosity regulators, preference being given to carboxymethylcellulose and hydroxyethylcellulose, wetting agents and dispersant additives, and emulsifiers.

The solids content of the aqueous emulsion computes from the sum total of all the components minus the water.

The aqueous emulsion preferably contains from 1 to 50 wt % of nanoparticles based on the solids content of the emulsion, more preferably from 5 to 30 and yet more preferably from 10 to 20 wt %.

Particular preference is given to the process for producing nanoparticle-coated fibre material, the coating of which includes between 0.01 and less than 2.0 wt % of nanoparticles based on the dry weight of the coated fibre material and wherein the fibre material is contacted with an aqueous emulsion containing a nanoparticle-containing film-former by dipping, spraying or using a bath, and wherein the coated fibre material is subsequently dried, wherein the aqueous emulsion contains surface-modified spherical silica nanoparticles, wherein the film-former is an epoxy resin, wherein the aqueous emulsion contains from 10 to 20 wt % of nanoparticles based on the solids content of the emulsion.

Drying in the process of the present invention is preferably carried out at temperatures above room temperature, more preferably in the range from 30 to 95° C., yet more preferably in the range from 35 to 90° C., yet still more preferably in the range from 40 to 85° C., yet still even more preferably in the range from 45 to 80° C., yet still even further preferably in the range from 50 to 75° C. and most preferably in the range from 55 to 70° C.

Drying is preferably carried out within from 0.5 to 10 minutes, more preferably within from 1 to 3 minutes.

Drying is preferably carried out with hot air in countercurrent.

Drying in the process of the present invention is particularly carried out at temperatures of 55 to 70° C. with hot air in countercurrent in the course of from 1 to 3 min.

The coating operation and the drying operation of the process according to the present invention may be carried out repeatedly.

To determine the nanoparticle content, the fibre material is preferably dried to constant weight at the end of the process according to the present invention. This drying to constant weight is preferably carried out at from 55 to 70° C., the material is weighed after cooling down to room temperature, and the operation of drying and weighing is repeated until at least two successive weighings differ by less than 0.5% of the measured value.

The invention further provides for the use of nanoparticle-coated fibre materials of the present invention and/or of process products according to the present invention in the manufacture of fibre composite materials.

The invention further provides fibre composite materials containing the nanoparticle-coated fibre material of the present invention and/or the process product of the present invention in a polymer matrix.

The polymer matrix is preferably a thermoset, more preferably an epoxy resin, a vinyl ester resin or an unsaturated polyester resin, yet more preferably an epoxy resin.

One advantage of the nanoparticle-coated fibre materials of the present invention is that the inclusion of nanoparticles in the fibre sizing improves not just the fibre properties, but surprisingly also the properties of fibre composite materials produced therefrom. More particularly, the fracture toughness and the fatigue behaviour under cyclic stress are improved. In the prior art, improvements of this kind are only found as a consequence of modifying the entire resin matrix with nanoparticles.

A further advantage is that an extremely small amount of nanomaterials in the coating on fibre materials is already sufficient to create the desired effect and that an increase in the mass of nanomaterials does not yield any further improvement in the mechanical properties of fibre composite materials produced therefrom.

A further advantage is that fibre composite materials containing fibre material having a mass of nanomaterials which extends beyond the range claimed by the present invention has worse properties than the fibre composite materials of the present invention.

The examples provide evidence that just 0.4 wt % of $SiO_2$ nanoparticles, based on the dry fibre mass, were more than double the fracture toughness of the fibre composite material.

The fatigue behaviour is particularly important for a laminate. This is tested in a cyclic three-point bending test. In this test, a sheet of the fibre composite material is subjected to cyclic loading and the recovered energy is measured. This is used to compute the energy dissipated in the laminate, which leads to laminate damage and finally to laminate fracture. The higher the dissipated energy, the fewer the number of cycles survived by a laminate, i.e. the shorter the laminate life.

The examples show that the dissipated energy on using the nanoparticle-coated fibre materials of the present invention in fibre composite materials is significantly reduced even at very low mass fractions. The examples further show that an increase in the nanomaterial fraction will only bring about a minimal improvement to this property, if any. Above a certain mass fraction, even a deterioration is observed.

The coating of fibre materials with such small amounts of nanomaterials is an advance in the art and simplifies the coating process.

The subject-matter provided by the invention is illustratively described hereinbelow without any intention to limit the invention to these illustrative embodiments. Where ranges, general formulae or compound classes are specified hereinbelow, these shall include not just the corresponding ranges or groups of compounds that are explicitly mentioned but also all sub-ranges and sub-groups of compounds which can be obtained by extracting individual values (ranges) or compounds. When documents are cited in the context of the present description, the contents thereof, particularly with regard to the subject-matter that forms the context in which the document has been cited, are considered in their entirety to form part of the disclosure content of the present invention. Unless stated otherwise, percentages are figures in percent by weight. When average values are reported hereinbelow, the values in question are weight averages, unless stated otherwise. When parameters which have been determined by measurement are reported hereinafter, they have been determined at a temperature of 25° C. and a pressure of 101 325 Pa, unless stated otherwise.

EXAMPLES

Materials:

Nanopox® F 400 (trade mark of Evonik Hanse GmbH, Germany) contains 40 wt % of $SiO_2$ particles having a (number average) diameter of 20 nm and was first emulsified with water. This aqueous emulsion was subsequently diluted to the values reported in the examples.

Neoxil 965 (DSM Composite Resins) was always employed as a 4 wt % emulsion in water based on the overall emulsion.

Desizing of Fibre Materials:

A fibre bundle is led past an IR radiator at a distance of 2 cm. The speed was optimized to ensure complete removal of the original sizing. This was determined via the loss of mass.

General Coating Process:

A rotating applicator roll applies the film-former atop the fibre material. The applicator roll dips with its bottom side into the sizing bath, picks up a certain amount of film-former as it rotates, and the fibre material is contacted with the film-former on the top side of the roll. The speeds of the roll and of the fibre material are aligned such that there is no speed difference.

Example 1, Sizing Desized Glass Fibres

The glass fibre material StarRov®086 (trade mark of Johns Manville, USA), of the PR 220 1200 086 variant, was desized by IR irradiation, cooled down to room temperature and weighed. The fibre bundles were coated directly thereafter. The dip bath contained an aqueous emulsion of epoxy resin film-formers with or without $SiO_2$ nanoparticles. After dipping, the fibres were dried at 60° C. to constant weight. The sizing add-on was subsequently rechecked by differential weighing.

The sizing materials were each applied at 1.8 wt % (based on the mass sum total of the fibres after cleaning+applied coating). Three sizing materials were tested.

The dip baths had the following compositions:
1. Neoxil 965 only
2. Mixture of 50 wt % of Neoxil 965 and 50 wt % of Nanopox F 400 (as 2 wt % $SiO_2$ aqueous emulsion)
3. Mixture of 50 wt % of Neoxil 965 and 50 wt % of Nanopox F 400 (as 5 wt % $SiO_2$ aqueous emulsion).

At constant weight, the coatings accordingly compute as follows:
System 1: 1.8 wt % of Neoxil 965, not according to the present invention
System 2: 1.2 wt % of Neoxil 965 and 0.6 wt % of Nanopox F 400, corresponding to 0.24 wt % of $SiO_2$
System 3: 0.8 wt % of Neoxil 965 and 1 wt % of Nanopox F 400, corresponding to 0.4 wt % of $SiO_2$ The coated fibre materials were then used to wind test specimens as UD materials. These were subsequently saturated with the epoxy resin/hardener mix and cured in accordance with the manufacturer's directions. The epoxy resin Infusion Resin MGS® RIM 135 (trade mark of Hexion, Germany) was used in combination with the hardener RIMH 137 (Hexion). The impregnating method chosen was VARI (Vacuum Assisted Resin Infusion). The laminates thus obtained were tested in respect of their mechanical properties.

The results are summarized in Table 1, 5 test specimens were measured in each case, the arithmetic means are reported:

Fracture toughness was measured to DIN EN ISO 15024: 2001 with the following parameters: 65 mm "delamination strength".

Transverse tensile strength was determined to DIN EN ISO 527-5:2008.

Dissipated energy was determined to DIN EN ISO 13003: 2003 in the three-point bending test after 3000 cycles.

TABLE 1

Mechanical properties of laminates as per Example 1

| Test | System 1 | System 2 | System 3 |
|---|---|---|---|
| Transverse tensile strength | 16 mPas | 22 mPas | 16 mPas |
| Fracture toughness $G_{Ic}$ | 419 J/m$^2$ | 550 J/m$^2$ | n.d. |
| Dissipated energy | 4 Nmm | 2.5 Nmm | 2.4 Nmm |

Transverse tensile strength is distinctly improved for system 2, featuring a nanoparticle content of 0.24 wt % on the fibre (corresponding to 0.6 wt % of Nanopox F 400).

Fracture toughness of the laminate also improves by more than 30% to 550 J/m$^2$ in the case of system 2.

The dissipated energy data provide evidence that the presence of nanoparticles on the fibre leads to a distinct improvement in fatigue behaviour.

Example 2, Sizing Glass Fibres Having Commercial Sizing as Substrate

An industrial biaxial NCF having a basis weight of 807 g/m$^2$ and a +45/−45° orientation (Saertex) was used. What is concerned here is the glass fibre material Hybon® 2001/2 600 tex (trade mark of PPG Fiber Glass, USA), which had an unknown epoxy sizing without nanomaterials.

Repeated dipping into an aqueous emulsion of Nanopox F 400 and subsequent drying at 60° C. as described in Example 1 was used to produce two modified non-crimp fabrics with differing add-on. The non-crimp fabric as supplied (system A, comparator), with an additional 1.5 wt % (corresponding to 0.6 wt % of $SiO_2$, system B) of Nanopox based on fabric weight and also with an additional 4 wt % of Nanopox (corresponding to 1.6 wt % of $SiO_2$, system C) were then processed into a fibre composite material. To this end, a plied construction ([+45/−45/0/90/−45/+45/90/0])s was processed by VARI (Vacuum Assisted Resin Infusion) into sheets 5 mm in thickness. The resin/hardener system used was Epikote RIMR 135 and Epikure RIMH 137 as in Example 1.

Interlaminar shear strength (ILSS), determined to ASTM-D 2344, was virtually identical for all three laminates at 47 MPa for system A (control), 45 MPa for system B and 49 MPa for system C. What improves conspicuously is the fracture toughness of the laminates, as determined to ASTM-D 5528, as shown in Table 2.

TABLE 2

Mechanical properties of laminates as per Example 2

| Test | System A | System B | System C |
|---|---|---|---|
| Fracture toughness $G_{Ic}$ | 950 J/m$^2$ | 1780 J/m$^2$ | 1920 J/m$^2$ |

An add-on of 0.6 wt % of $SiO_2$ nanoparticles on the fabric improves fracture toughness by 86%. An add-on of 1.6 wt % of nanoparticles even yields an improvement by 102%.

The invention claimed is:

1. A nanoparticle-coated fibre material, comprising a fibre material and a coating on at least a portion of the fibre material, wherein:
   the coating comprises from 0.01 wt % to less than 0.4 wt % of nanoparticles based on a dry weight of the nanoparticle-coated fibre material;
   the coating is capable of undergoing further reactions; and
   the nanoparticles comprise surface-modified spherical silica nanoparticles.

2. The fibre material according to claim 1, wherein the fibre material comprises a glass fibre material.

3. The fibre material according to claim 1, wherein the coating further comprises crosslinkable epoxy groups capable of undergoing the further reactions.

4. The fibre material according to claim 1, wherein the coating further comprises an epoxy resin.

5. A process for producing a nanoparticle-coated fibre material, the process comprising:
   contacting a fibre material with an aqueous emulsion comprising a film-former by dipping, spraying or bathing the fibre material with the aqueous emulsion, to obtain a coated fibre material; and then drying the coated fibre material, to obtain a nanoparticle-coated fibre material, wherein:

the aqueous emulsion further comprises surface-modified spherical silica nanoparticles; and the coating of the nanoparticle-coated fibre material comprises from 0.01 wt % to less than 0.4 wt % of nanoparticles based on a dry weight of the coated fibre material.

6. A process for producing a nanoparticle-coated fibre material, the process comprising:

contacting a fibre material with an aqueous emulsion comprising a film-former, to obtain a coated fibre material; and then drying the coated fibre material, to obtain a nanoparticle-coated fibre material, wherein:

the aqueous emulsion further comprises surface-modified spherical silica nanoparticles;

the coating of the nanoparticle-coated fibre material comprises from 0.01 wt % to less than 0.4 wt % of nanoparticles based on a dry weight of the coated fibre material; and the contacting occurs by applying the aqueous emulsion to the fibre material with a rotating applicator roll, such that the contacting does not occur by directly dipping the fibre material into a bath of the aqueous emulsion.

7. The process according to claim 5, wherein the aqueous emulsion comprises from 1 to 50 wt % of the surface-modified spherical nanoparticles based on a solids content of the aqueous emulsion.

8. A fibre composite material, comprising the nanoparticle-coated fibre material of claim 1.

9. The fibre composite material according to claim 8, comprising the nanoparticle-coated fibre material in a polymer matrix.

10. The fibre composite material according to claim 9, wherein the polymer matrix is a thermoset polymer matrix.

11. The fibre composite material according to claim 10, wherein the thermoset polymer matrix is an epoxy resin.

12. The process according to claim 6, wherein the aqueous emulsion comprises from 1 to 50 wt % of the surface-modified spherical nanoparticles based on a solids content of the aqueous emulsion.

* * * * *